United States Patent
Keperling, Sr. et al.

[11] Patent Number: 5,549,167
[45] Date of Patent: Aug. 27, 1996

[54] HILL MAKER HOE

[76] Inventors: Kevin M. Keperling, Sr., 133 Woodthrush Dr., York, Pa. 17403; Michael T. Moore, 24 Scotland Rd., Quarryville, both of Pa. 17566

[21] Appl. No.: 570,484
[22] Filed: Dec. 11, 1995
[51] Int. Cl.$^6$ .................................................. A01B 1/00
[52] U.S. Cl. ........................... 172/381; 172/372; D8/11
[58] Field of Search ................................. 172/381, 372, 172/371, 377; D8/10, 11

[56] References Cited

U.S. PATENT DOCUMENTS

| | | | |
|---|---|---|---|
| D. 32,448 | 4/1900 | Bedford | D8/11 |
| 52,510 | 2/1866 | Adams . | |
| D. 251,583 | 4/1979 | Baylis | D8/11 |
| 287,027 | 11/1883 | Iwan . | |
| D. 345,640 | 3/1994 | Galati | D8/10 X |
| D. 359,206 | 6/1995 | Bojar . | |
| 976,970 | 11/1910 | Walary | 172/372 |
| 1,109,469 | 9/1914 | Sandberg | 172/381 X |
| 1,541,643 | 6/1925 | Hendricks | 172/372 |
| 1,678,695 | 7/1928 | Ferguson | 172/381 X |
| 1,711,847 | 5/1929 | Hermanson | 172/372 |
| 2,085,382 | 6/1937 | Nebor | 172/381 X |
| 2,662,461 | 12/1953 | Upson . | |
| 3,800,883 | 4/1974 | Ronning | 172/371 |
| 4,246,970 | 1/1981 | Franke . | |
| 5,040,614 | 8/1991 | Nash | 172/371 X |
| 5,372,205 | 12/1994 | Velez | 172/381 X |
| 5,390,746 | 2/1995 | Page | 172/371 |

FOREIGN PATENT DOCUMENTS

| | | | |
|---|---|---|---|
| 48240 | 6/1911 | Australia | 172/381 |
| 2360389 | 3/1978 | France | 172/372 |
| 379181 | 8/1964 | Switzerland | 172/381 |
| 7896 | 5/1909 | United Kingdom | 172/372 |
| 912761 | 12/1962 | United Kingdom | D8/11 |
| 1171694 | 11/1969 | United Kingdom | 172/372 |

*Primary Examiner*—Dave W. Arola
*Assistant Examiner*—Christopher J. Novosad
*Attorney, Agent, or Firm*—Samuel M. Learned, Jr.

[57] ABSTRACT

A hill maker hoe embodying a set of semicircular rearwardly opposing concavo-convex blades assembled to an angularly and extensibly adjustable handle which enables a user to accommodate the hoe for individual height and weight profile as well as for ease of manual use and efficiency in employing the same to form and make a planting hill from a single location with but a simple push-pull motion thereof.

9 Claims, 4 Drawing Sheets

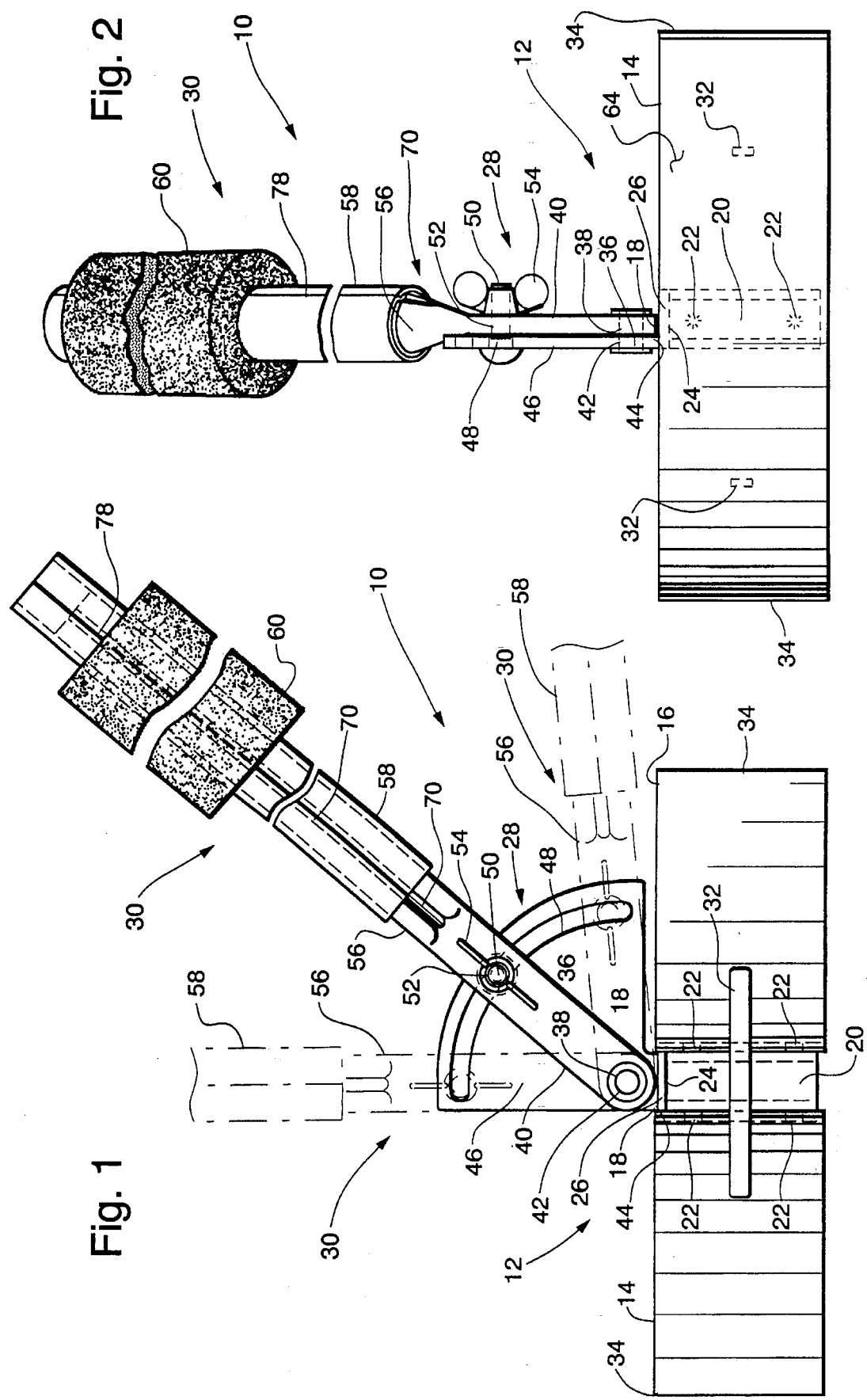

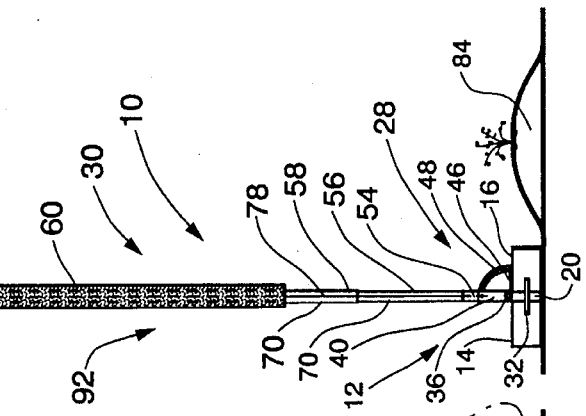
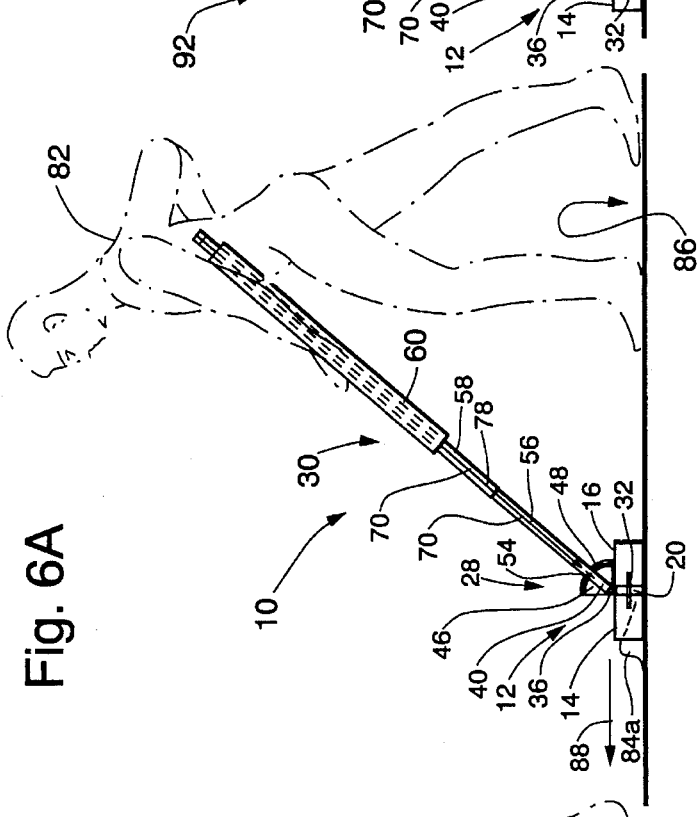
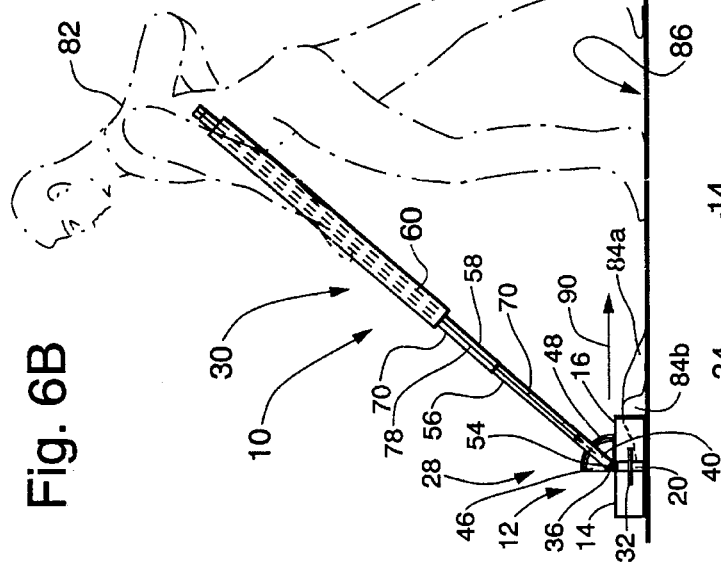
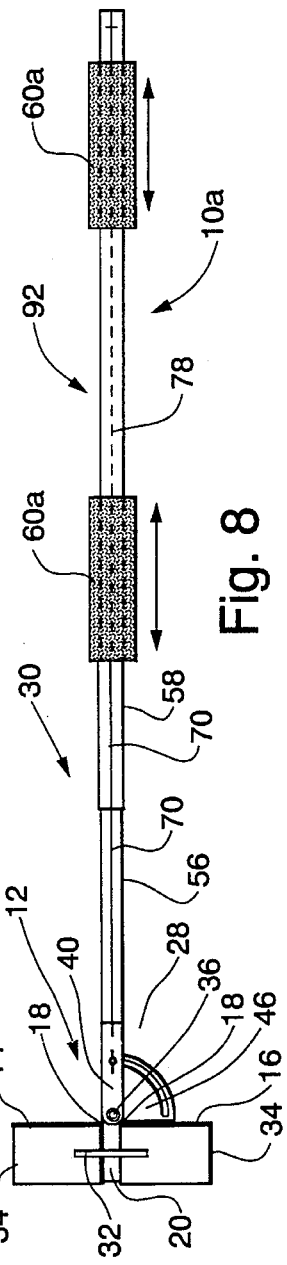

HILL MAKER HOE

BACKGROUND OF THE INVENTION

The present invention relates to a manual planting tool, denominated a hill maker hoe, which is specifically adapted by the means of a set of semicircular rearwardly opposing concavo-convex blades for the forming and making of planting hills. In addition, the hill maker hoe is provided with structural features which enable angular and extensible handle adjustment whereby the hoe may be accommodated to individual height and weight profile differentials for comfortable and efficient manipulation by the user.

Functionally, the teaching by Upson in his U.S. Pat. No. 2,662,461 dated Dec. 15, 1953, discloses a hoe having a single circular toothed blade or head assembled to an angularly adjustably fixed length handle, which is adapted to function, when desired, as a hilling hoe.

Structurally, the teaching by Iwan in U.S. Pat. No. 287,027 dated Oct. 23, 1883, shows a ditching hoe having a single elongated semicircular concavo-convex blade assembled to be angularly adjustable with respect to a fixed length handle. And, the respective teachings by Adams in U.S. Pat. No. 52,510 dated Feb. 13, 1866; Franke in U.S. Pat. No. 4,246,970 dated Jan. 27, 1981; and Bojar in U.S. Design Pat. No. 359,206 dated Jun. 13, 1995, all show scuttle type hoes having angularly adjustable single blades assembled to fixed length handles.

Although the foregoing citations disclose some aspects of functional and structural similarity to the instant invention, none of the same either singularly or in combination anticipate the invention of instant consideration, wherein the applicant herein teaches an apparatus and method which provides both a new and novel hoe structure and approach to effect convenient and efficient forming and making of planting hills.

SUMMARY OF THE INVENTION

It is the principal object of the present invention to provide a hill maker hoe specifically designed and adapted for manual employment in the forming and making of planting hills.

It is also an object of the present invention to provide a hill maker hoe which enhances the ease of manual use and efficiency in forming and making planting hills for vine crops such as cucumbers, melons or squash and the like.

It is further an object of the present invention to provide a hill maker hoe the use of which enables the forming and making of a planting hill without displaced movement of the user from a single location, with but a simple push-pull motion of the hoe away and toward the user.

It is another object of the present invention to provide a hill maker hoe having an angularly and extensibly adjustable handle which may be set at the most desireable angle and extension to accomodate height and weight differentials for comfortable and efficient manipulation by each individual user.

It is an additional object of the present invention to provide a hill maker hoe which is adapted to enable the positioning and securement of the handle thereof in a vertically upright position so the hoe may be conveniently and safely stowed in a free standing mode.

It is a further object of the present invention to provide a hill maker hoe which is simple and rugged in construction, easy and economical to manufacture and assemble, and requires minimum care and maintenance.

The foregoing, and other objects hereof, will be readily evident upon a study of the following specification and accompanying drawings comprising a part thereof.

BRIEF DESCRIPTION OF THE DRAWINGS

FIG. 1 is a side elevation view of a hill maker hoe with the angularly and extensibly adjustable telescoping handle thereof foreshortened to accommodate the view to the sheet, being further shown with the handle set at an operationally intermediate angular position wherein the angular adjustment limit positions thereof are respectively shown in phantom.

FIG. 2 is a front elevation view of the hill maker hoe as previously shown in FIG. 1.

FIG. 6A schematically illustrates the user push cycle employing the hill maker hoe to form a planting hill.

FIG. 6B schematically illustrates the user pull cycle employing the hill maker hoe to complete the formation of a planting hill.

FIG. 7 shows a formed planting hill with the hill maker hoe handle angularly adjusted and set for stowage in the free standig mode.

FIG. 8 is an alternate embodiment elevation view of the hill maker hoe.

DETAILED DESCRIPTION OF THE INVENTION

Figure 3:
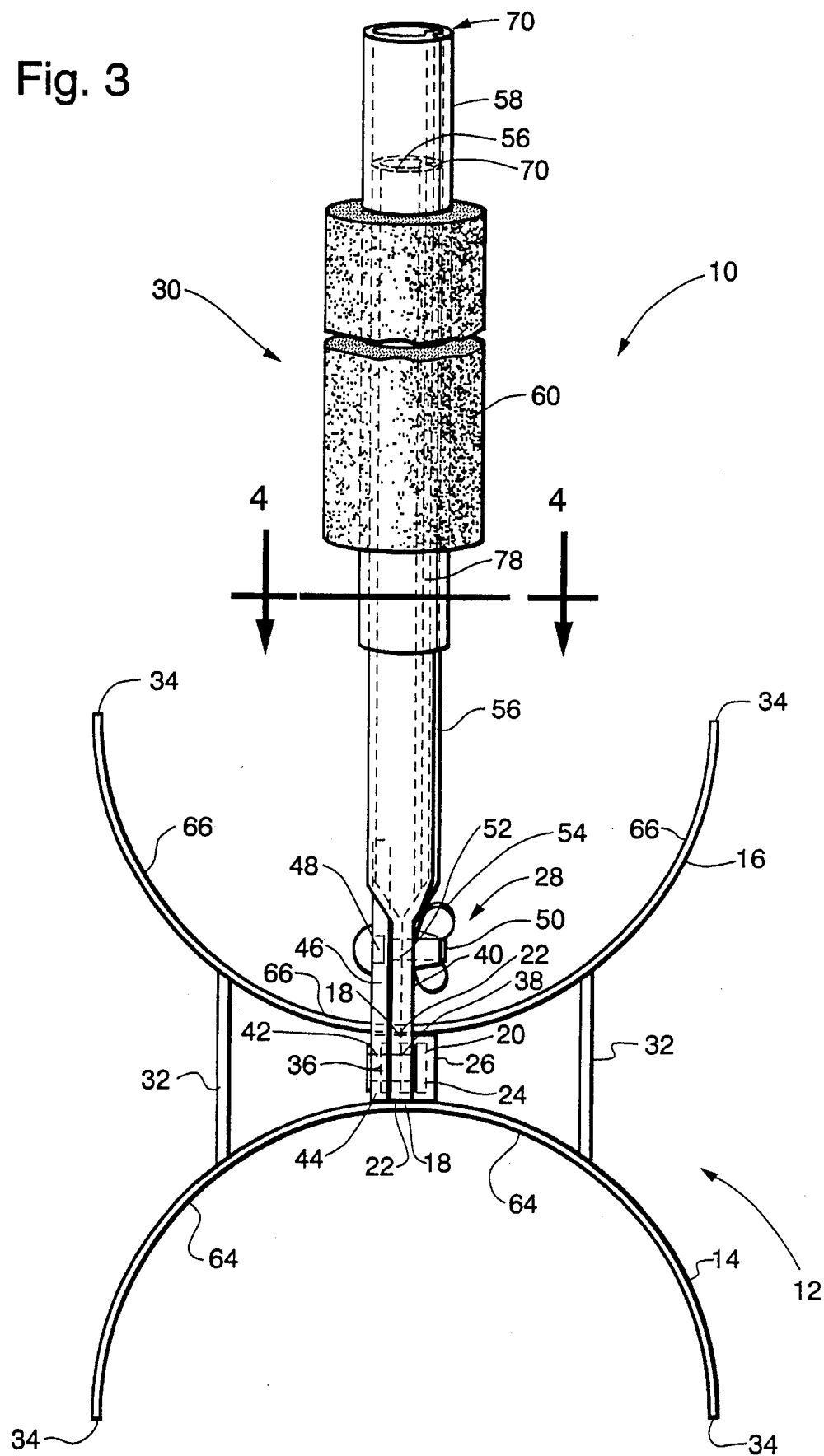
FIG. 3 is a top plan view of the hill maker hoe previously show in FIG. 1.

Referring to FIG. 1, the hill maker hoe 10 of present invention and the component parts thereof comprising the same are shown in a foreshortened side elevation view, which component parts cooperatively consist of a set of semicircular rearwardly opposing concavo-convex blades 12 being a first blade 14 and a second blade 16 connectably joined in spaced osculating conjunction at their respective radial apices 18 to an interposed tubular member 20 by means of spot welds 22 or other suitable connecting means such as rivets or the like, wherein the vertically upward end 24 of said interposed tubular member 20 provides a support surface upon which to connectably assemble the base plate 26 of a handle angle adjustment means 28 to which an extensibly adjustable handle 30 is pivotally assembled. Additional structural features of the hill maker hoe 10 shown in FIG. 1 include the blade stabilizing struts 32, which cooperate with interposed tubular member 20 in supporting and stabilizing connection of the first and second blades 14 and 16 one to the other by joining either side of their respective outer convex surfaces intermediate the apices 18 thereof and the respective blade ends 34.

Further shown in FIG. 1 is structural detail of the handle angle adjustment means 28 whereby the extensibly adjustable handle 30 is angularly set and fixed to accommodate both comfortable and efficient employment of the hoe 10 by a user relative to the user's height, wherein the handle 30, shown set at an intermediate angular position, has angular adjustment through a range to the respective limit positions as illustrated in phantom.

For the foregoing purpose, the extensibly adjustable handle 30 is pivotally assembled for arcuate adjustment by means of a handle retainer pivot pintle 36 which insertably communicates cooperatively and retentively through a handle pivot point opening 38 provided at the end of the planar handle extension 40 and the plate opening 42 provided at the apex 44 of the radial quarter-quadrant plate 46, which plate 46 in turn is connectably assembled to the base plate 26 on central axial alignment with the blade ends 34 and thereby pivotally connects the handle 30 to the set of semicircular rearwardly opposing concavo-convex blades 12 in operational alignment as more clearly shown in FIGS. 2 and 3. Cooperative with the foregoing handle 30 retention and pivot structure is the handle angle adjustment and set structure comprised of an arcuate handle angle adjustment slot 48 provided in radial coincidence interior the radial periphery of the plate 46 and being adapted to cooperatively receive insertably and slidably the shaft of a bolt 50 communicating through said slot 48 and through the handle arcuate adjustment bolt opening 52. By means of a wing nut 54 threadably communicating inward upon said bolt 50, and thereby compressively engaging against said planar handle extension 40 which in turn compressively and frictionally engages said radial quater-quadrant plate 46, the arcuate angle adjustment set of said handle 30 is accomplished and fixed.

Also shown in foreshortened view in FIG. 1 is the extensibly adjustable handle 30, which has as major component parts thereof the planar handle extension 40 which connectably communicates with the male handle member 56 which in turn insertably and slidably communicates extensibly within the female handle member 58, all of which is encased within a handle cushion cover 60 adapted to provide enhanced user comfort and handle purchase when operationally employing the hill maker hoe 10.

The hill maker hoe 10 as hereinabove discussed on consideration of FIG. 1, and hereinafter more fully described, is preferably constructed from metal or metal alloy materials, however, any other suitable materials such as plastics or the like, or combinations thereof, may be used.

Turning consideration now to FIG. 2, wherein a front elevation view of the hill maker hoe 10 is shown, more specifically the connectably assembled central axial alignment of the base plate 26 and the radial quarter-quadrant plate 46 with respect to the blade ends 34. Also shown in more specific detail is the wing nut 54 in compressive engagement inward upon bolt 50 to thereby in turn compressively engage the planar handle extension 40 against the radial quarter-quadrant plate 46 and thereby effect the adjusted fixing of handle 30 angular set.

Now considering FIG. 3 and the top plan view of the hill maker hoe therein illustrated. As shown, the first and second blades 14 and 16 of the semicircular rearwardly opposing concavo-convex set 12 are connectably joined in spaced osculating conjunction at their respective radial apices 18 to the interposed tubular member 20, to which in turn is upwardly attached the base plate 26 connectably mounting the handle angle adjustment means 28. Further connecting the blades 14 and 16 one to the other by joining either side of their respective surfaces intermediate the apices 18 thereof and the respective blade ends 34 are the blade stabilizing struts 32. Also more clearly shown in FIG. 3 are the first blade hill forming push surface 64 and the second blade hill forming pull surface 66, both of which are cooperatively employed by a user through the connecting extensibly adjustable handle 30 in push-pull operation to form a planting hill as will hereinafter be more fully described.

Figure 4A:
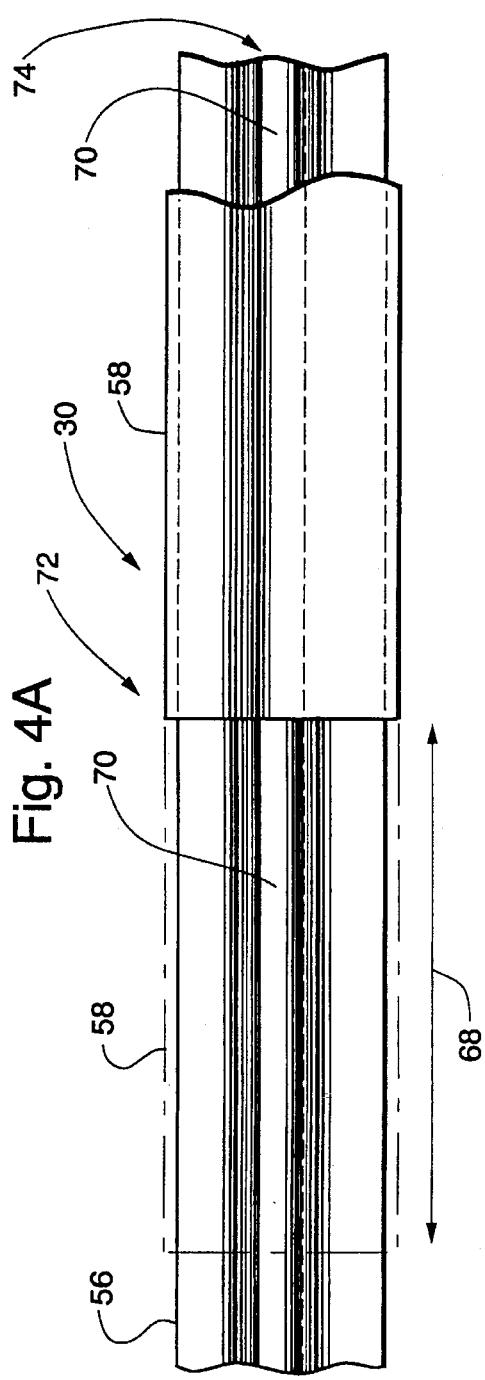
FIG. 4A is a foreshortened elevation view of the handle structure as shown in FIG. 4 to illustrate the extensibly adjustable telescoping feature thereof.
Figure 4:
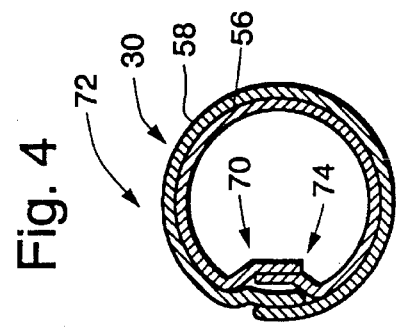
FIG. 4 is a sectional view of the handle structure as shown in FIG. 3 and seen along the line 4—4, being illustrated in the unlocked extensibly adjustable telescoping mode thereof.
Figure 5A:
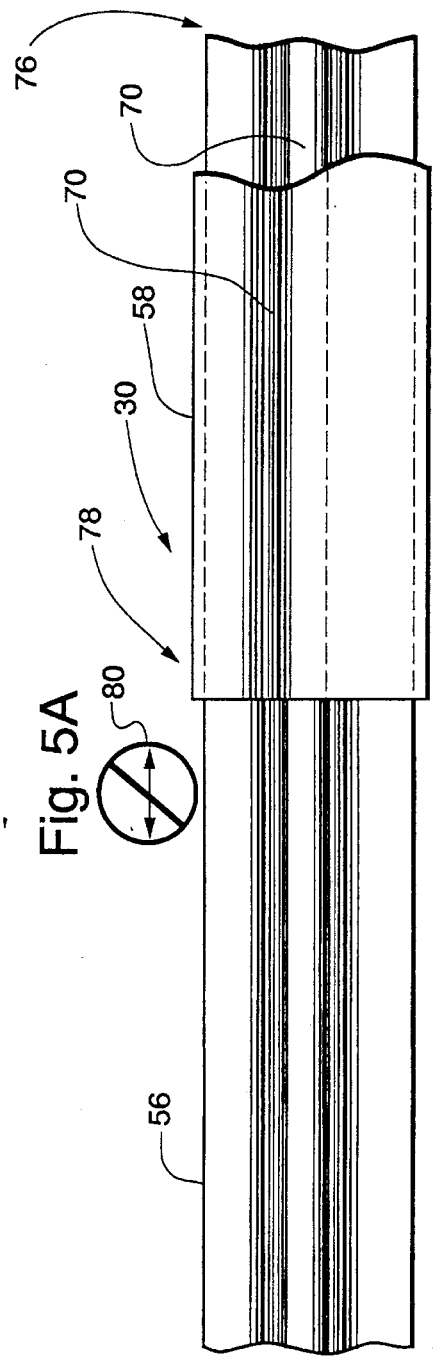
FIG. 5A is a foreshortened elevation view of the handle structure shown in FIG. 5 to illustrate the extensibly adjustable telescoping set feature thereof.
Figure 5:
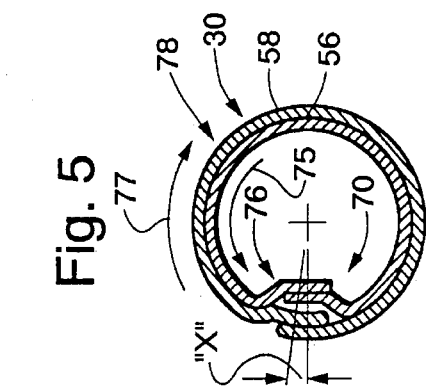
FIG. 5 is a sectional view of the handle structure corresponding to FIG. 4, showing, however, the respective extensibly adjustable handle sections thereof rotatably engaged in the locked non-extensibly adjustable telescoping mode.

Directing attention now to FIGS. 4 and 5 in consideration of the extensibly adjustable handle 30 feature and operation. As shown, the extensibly adjustable handle 30 is comprised of a male handle member 56 insertably slidable within a female handle member 58 as indicated by adjustment arrow 68 in FIG. 4A, such that the extensibly adjustable handle 30 is telescopically moveable in or out to either shorten or lengthen the handle 30 to accommodate the physical stature and further comfort as well as efficient utilization of the hoe 10 by users of varying physical profiles and weights. It will also be noted that the spring biased twist lock extension set keeper 70, in the handle shortening or lengthening adjustment mode 72 as illustrated respectively in FIGS. 4 and 4A, is in a neutral spring biased non-binding position 74 thus allowing the male handle member 56 to slidably adjust extensibly in or out relative to the female handle member 58. Once adjusted to that length most comfortable and suitable for efficient hoe 10 employment by a user, the handle 10 extension adjustment is then fixed by user rotation of handle member 56 relative to handle member 58 arcuately through angle "X" as shown respectively by rotation arrows 75 and 77 in FIG. 5, thereby twist-lock setting the spring biased twist lock extension set keeper 70 to a compressive binding position 76 in the handle lock set mode 78 as respectively illustrated in Figs. 5 and 5A and as indicated by the lock set arrow 80 in FIG. 5A. Thus, in the foregoing manner the handle 30 is adjusted and set in a fixed extension.

Considering now the method of employment of the hill maker hoe 10 by an exemplary user 82 as respectively illustrated in FIGS. 6A and 6B in the use of said hoe 10 to form a planting hill 84 as shown in FIG. 7. As previously described, once the handle 30 angle and extension are adjustably set to accommodate the comfortable and efficient employment of hoe 10 by a user 82, the hoe 10 is then employed by a simple push-pull motion from a single user location in forming a planting hill 84. The push cycle is accomplished by a user 82 utilizing the first blade 14 in a pushing motion away from his location 86 in order to form the first half of the planting hill 84a as shown in FIG. 6A. Secondly, from the same location 86 as now shown in FIG. 6B, the user 82 repositions the hoe 10 and in a pull cycle, utilizing the second blade 16 in a pulling motion toward his location 86 as indicated by arrow 90, the user 82 forms the second half of the planting hill 84b. In FIG. 7 a completely formed planting hill 84 is shown, with the hill maker hoe 10 being illustrated in a free standing mode 92 for the convenient and safe stowage thereof, which is accomplished by adjustably profiling the angle set of the handle 30 in a vertically upright position and setting the hoe 10 to rest on the bottom supportive surfaces of the set of semicircular rearwardly opposing concavo-convex blades 12. It should be noted that the free standing mode 92 stowage capability of hoe 10 in providing higher visibility and keeping it off the ground where it might cause one to trip, or it may be lost, are among the desirable and advantageous safety and convenience features thereof.

Considering lastly the view shown in FIG. 8, illustrating an alternate embodiment hill maker hoe 10a which is also disposed in the free standing mode stowage position 92, being distinguished, however, by having a two-part slidably adjustable handle cushion cover 60a. In this version of the hill maker hoe 10a, ergonomics in the dual sense of both utility and cost effectiveness is realized in that a user may slidably position or re-position either or both of the reduced material two-part slidably adjustable handle cushion covers 60a up or down the handle 30 in order to achieve the most suitable and satisfactory operational use and efficiency result.

Although the hill maker hoe invention hereof, the structural characteristics and method of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

We claim:

1. A hill maker hoe comprising a set of equally dimensioned semicircular portions forming rearwardly opposing concavo-convex blades such that concave sides of said blades face away from each other, an interposed tubular member connectably joining said set of blades with the semicircular portions facing in opposing direction and connected in osculating conjunction at the respective radial apices thereof, and an extensibly adjustable handle means pivotally connected to said set of blades by a handle angle adjustment means.

2. A hill maker hoe according to claim 1 wherein said interposed tubular member connectably joins said set of blades by means of a plurality of spot welds.

3. A hill maker hoe according to claim 1 wherein said extensibly adjustable handle means is comprised of a male handle member slidably insertable and longitudinally set by counterrotation of said male handle member within a female handle member to thereby compressively engage a spring biased twist lock extension set keeper and fix said handle in an adjusted position.

4. A hill maker hoe according to claim 1 wherein said handle means is provided with a handle cushion cover.

5. A hill maker hoe according to claim 4 wherein said handle cushion cover is of a unitary construction.

6. A hill maker hoe according to claim 4 wherein said handle cushion cover is of a two-part slidably adjustable construction.

7. A hill maker hoe according to claim 1 wherein said set of blades are cooperatively supported by a set of blade stabilizing struts.

8. A hill maker hoe according to claim 1 wherein said handle angle adjustment means is comprised of a radial quarter-quadrant plate having a handle arcuate adjustment bolt opening cooperative with a bolt and a wing nut insertably operative compressively against a planar handle extension being pivotal about the apex of said radial quarter-quadrant plate and provided with a handle arcuate adjustment bolt opening wherein handle angle adjustment is infinitely variable within limits of said handle arcuate adjustment bolt opening.

9. A planting hill forming method employing a hill maker hoe having a set of equally dimensioned semicircular portions forming rearwardly opposing concavo-convex blades connectably joined with said semicircular portions facing in opposing direction such that concave sides of said blades face away from each other and connected in osculating conjunction at the respective radial apices thereof with an extensible handle pivotally connected thereto and with said handle in a handle extended disposition and adapted for executing a manual push-pull motion from a single location, comprising performing a push cycle utilizing an outward facing first blade of said set of rearwardly opposing blades from said single location to form a first half of a planting hill; outwardly repositioning said set of rearwardly opposing blades from said single location; and performing a pull cycle utilizing an inward facing second blade of said set of rearwardly opposing blades from said single location to cooperatively form and join a second half of said planting hill to said first half thereof in completion of said planting hill forming method.

* * * * *